United States Patent
Zeumer et al.

(10) Patent No.: US 11,333,084 B2
(45) Date of Patent: May 17, 2022

(54) EXHAUST GAS FLAP

(71) Applicant: Eberspächer Exhaust Technology GmbH & Co. KG, Neunkirchen (DE)

(72) Inventors: Annika Zeumer, Wernau (DE); Steffen Schmitt, Ostfildern (DE)

(73) Assignee: PUREM GMBH, Neunkirchen (DE)

( * ) Notice: Subject to any disclaimer, the term of this patent is extended or adjusted under 35 U.S.C. 154(b) by 0 days.

(21) Appl. No.: 16/579,091

(22) Filed: Sep. 23, 2019

(65) Prior Publication Data

US 2020/0095946 A1 Mar. 26, 2020

(30) Foreign Application Priority Data

Sep. 24, 2018 (DE) ...................... 10 2018 123 403.1

(51) Int. Cl.
*F02D 9/10* (2006.01)
*F02D 9/04* (2006.01)
*F16K 1/22* (2006.01)

(52) U.S. Cl.
CPC ............. *F02D 9/1065* (2013.01); *F02D 9/04* (2013.01); *F02D 9/107* (2013.01); *F16K 1/221* (2013.01)

(58) Field of Classification Search
CPC .................................. F02D 9/1065; F16D 3/06
See application file for complete search history.

(56) References Cited

U.S. PATENT DOCUMENTS

2017/0284310 A1\* 10/2017 Delplanque ............ F02M 26/54

FOREIGN PATENT DOCUMENTS

| CN | 1715628 A | 1/2006 |
|---|---|---|
| CN | 102954231 A | 3/2013 |
| CN | 107542581 A | 1/2018 |
| CN | 107575496 A | 1/2018 |
| DE | 102009016597 B4 | 10/2012 |
| DE | 102011107088 A1 | 1/2013 |
| DE | 102014017523 A1 | 6/2015 |
| DE | 102014113332 B3 | 11/2015 |
| DE | 102014118492 A1 | 6/2016 |
| DE | 10 2015 202211 A1 | 8/2016 |
| DE | 102015222609 A1 | 5/2017 |
| DE | 10 2016 203794 A1 | 9/2017 |
| DE | 10 2017 105889 A1 | 10/2017 |
| DE | 102016114704 A1 | 1/2018 |

\* cited by examiner

*Primary Examiner* — Kenneth Rinehart
*Assistant Examiner* — Nicole Gardner
(74) *Attorney, Agent, or Firm* — McGlew and Tuttle, P.C.

(57) ABSTRACT

An exhaust gas flap includes a flap tube (12), a flap diaphragm (16), in an interior of the flap tube on a pivot shaft (14) rotatable about a pivot axis (A), a pivot drive (30) for the pivot shaft (14) and a coupling device (36) coupling the pivot shaft to a drive shaft (34). The coupling device includes a first coupling area (42) rotationally coupled, positive-lockingly meshed with the drive shaft and a second coupling area (44) rotationally coupled, positive-lockingly meshed with the pivot shaft. A biasing element (58) is supported in relation to the coupling device and in relation to one shaft of the drive shaft and the pivot shaft. The coupling device is axially prestressed, by the prestressing element, away from the one shaft along in the direction of the pivot axis and is prestressed about the pivot axis in relation to the one shaft.

20 Claims, 6 Drawing Sheets

EXHAUST GAS FLAP

CROSS REFERENCE TO RELATED APPLICATIONS

This application claims the benefit of priority under 35 U.S.C. § 119 of German Application 10 2018 123 403.1, filed Sep. 24, 2018, the entire contents of which are incorporated herein by reference.

TECHNICAL FIELD

The present invention pertains to an exhaust gas flap, especially for the exhaust gas stream of an internal combustion engine, comprising a flap tube, a flap diaphragm which is carried in the interior of the flap tube on a pivot shaft rotatable about a pivot axis, a pivot drive for the pivot shaft as well as a coupling device coupling the pivot shaft to a drive shaft of the pivot drive for joint rotation about the pivot axis, the coupling device comprising a first coupling area that is in a state of rotary coupling positive-locking meshing with the drive shaft and a second coupling area that is in a state of rotary coupling positive-locking meshing with the pivot shaft.

TECHNICAL BACKGROUND

Such an exhaust gas flap is known from DE 10 2016 114 704 A1. This exhaust gas flap has a coupling device that comprises two coupling elements, which are bent, for example, from spring sheet metal or the like. One coupling element provides a first coupling area, in which the coupling device is in a state of rotary coupling positive-locking meshing with the drive shaft. Another coupling element provides a second coupling area, in which the coupling device is in a state of rotary coupling positive-locking meshing with the pivot shaft. Furthermore, the two coupling elements mesh with one another in two areas located on the outside radially in relation to the pivot axis and are in a state of rotary coupling positive-locking meshing with one another in this manner and are axially supported in relation to one another. With this, the pivot shaft is prestressed in a direction away from the drive shaft via this axial support and via the prestress generated thereby and is thus held in a defined position in the axial direction in relation to the pivot axis.

SUMMARY

An object of the present invention is to provide an exhaust gas flap, in which a defined positioning of the drive shaft in relation to the pivot shaft is guaranteed.

This object is accomplished according to the present invention by an exhaust gas flap, especially for the exhaust gas stream of an internal combustion engine, comprising a flap tube, a flap diaphragm which is carried in the interior of the flap tube on a pivot shaft rotatable about a pivot axis, a pivot drive for the pivot shaft as well as a coupling device coupling the pivot shaft to a drive shaft of the pivot drive for joint rotation about the pivot axis, the coupling device comprising a first coupling area that is in a state of rotary coupling positive-locking meshing with the drive shaft and a second coupling area that is in a state of rotary coupling positive-locking meshing with the pivot shaft.

This exhaust gas flap is characterized by a biasing element (also referred to as a prestressing element), which is supported in relation to the coupling device, on the one hand, and in relation to one shaft of the drive shaft and the pivot shaft, on the other hand, the coupling device being axially prestressed by the biasing/prestressing element away from the one shaft of the drive shaft and the pivot shaft, i.e., axially prestressed towards the other shaft, and being prestressed about the pivot axis in relation to the one shaft of the drive shaft and the pivot shaft.

In the case of the exhaust gas flap configured according to the present invention, the function of the rotary coupling of the drive shaft and the pivot shaft, on the one hand, and the function of generating a prestressing force for bringing about a defined positioning of the two shafts, on the other hand, are structurally uncoupled. This makes it possible to configure the components and the assembly units intended for providing these functions, especially the coupling device, on the one hand, and the biasing/prestressing element, on the other hand, for the functions to be performed by same, in an optimized manner.

In case of a configuration which can be embodied in a simple manner and yet operates in a reliable manner, the biasing/prestressing element may comprise a coil spring. It should be noted that such a coil spring does not necessarily have to be configured with a constant winding radius in the direction of the pivot axis, which essentially corresponds to a longitudinal axis of the spring as well. The coil spring may have a varying winding radius in the direction of the spring longitudinal axis and may thus also have a varying course of the spring windings like a spiral spring.

It is proposed that the biasing/prestressing element be supported via a connection element in relation to the one shaft for an interaction between the biasing/prestressing element and the one shaft guaranteeing both prestressing in the axial direction and prestressing in the circumferential direction.

In particular, provisions may be made for the biasing/prestressing element to be permanently coupled (fixed) in a first connection area in relation to the one shaft, being axially supported via the connection element on the one shaft about the pivot axis in the circumferential direction, and to be permanently coupled (fixed) in a second connection area in relation to the coupling device, being axially supported on the coupling device about the pivot axis in the circumferential direction.

Especially when the biasing/prestressing element is configured as a coil spring, the first connection area may comprise a first winding end section extending in a first axial end area of the biasing/prestressing element and the second connection area may comprise a second winding end section extending in a second axial end area of the biasing/prestressing element.

For the stable coupling of the biasing/prestressing element to the connection element, it is proposed that the first connection area of the biasing/prestressing element be permanently coupled (fixed) to the connection element.

To be able to transmit the supporting force between the one shaft and the biasing/prestressing element that acts in the axial direction and in the circumferential direction, the connection element, being axially supported on the one shaft, may be coupled in a nonrotatable manner to the one shaft. In particular, provisions may be made here for at least one connection recess, preferably a plurality of connection recesses to be provided on the one shaft, and for at least one connection projection, preferably a connection projection in association with each connection recess, which meshes with a connection recess and is axially supported on the one shaft in a connected state and in the circumferential direction, to be provided on the connection element.

In an especially advantageous configuration for generating prestress in the circumferential direction, the at least one connection recess may comprise an insertion section, which is open and preferably essentially extends axially in the direction towards the other shaft as well as a connection section, which preferably essentially extends axially, is closed axially in the direction away from the other shaft, is offset in relation to the insertion section in the circumferential direction and is connected by means of a transition section to the insertion section, wherein an axial movement of a connection projection in the at least one connection recess through the insertion section thereof to the connection section thereof brings about a rotation of the connection element about the pivot axis in relation to the one shaft. The rotation of the connection element about the pivot axis that is caused by moving the connection element into its state of connection to the one shaft leads to a twisting of the biasing/prestressing element per se as well, since the first connection area which is permanently coupled to the connection element is also carried long in the circumferential direction during the rotation of the connection element, while the second connection area which is permanently connected to the coupling device cannot follow this circumferential movement or follows it only in a limited manner. The movement of the connection element into its state of connection thus automatically leads to the generation of the prestress acting in the circumferential direction.

In order to be able to generate a sufficient prestressing action both in the axial direction and in the circumferential direction, the biasing/prestressing element may comprise at least one winding, preferably a plurality of windings.

For the stable rotary coupling of the two shafts with one another, it is proposed that the coupling device have, in the first coupling area, a first positive-locking meshing opening with a meshing opening cross-sectional geometry and the drive shaft have a positive-locking meshing end, which meshes with the first positive-locking meshing opening and has a meshing end cross-sectional geometry complementary to the meshing opening cross-sectional geometry of the first positive-locking meshing opening, and that in the second coupling area, the coupling device have a second positive-locking meshing opening with a meshing opening cross-sectional geometry and the pivot shaft have a positive-locking meshing end, which meshes with the second positive-locking meshing opening and has a meshing end cross-sectional geometry complementary to the meshing opening cross-sectional geometry of the second positive-locking meshing opening. A configuration, in which the different cross-sectional geometries have each a polygonal configuration, is especially advantageous in this case.

In order to be able to generate an unhindered axial prestressing of the coupling device in the direction towards the other shaft due to the shape of the meshing end of the one shaft, it is proposed that the meshing end of the one shaft have an essentially cylindrical configuration in the direction of the pivot axis. Regardless of the respective, for example, polygonal cross-sectional geometry, the essentially cylindrical configuration of the meshing end of the one shaft makes possible an essentially unhindered axial displaceability of the one shaft in relation to the coupling device even in the area, in which the one shaft and the coupling device are in a state of rotary coupling positive-locking meshing with one another.

Provisions may be made in an advantageous configuration for the one shaft to be the drive shaft and for the other shaft to be the pivot shaft.

For a simple assembly of an exhaust gas flap configured according to the present invention, it is proposed that the coupling device and the biasing/prestressing element be carried on the other shaft in a manner secured against detachment from the other shaft. Especially in case of the permanent coupling of the biasing/prestressing element to the connection element, the connection element is also carried on the other shaft in a secured manner, so that the other shaft can form a preassembled assembly unit with the coupling device, with the biasing/prestressing element and with the connection element.

For a configuration that is simple to embody and yet is stable, the coupling device may comprise a coupling element, which has an essentially plate-shaped configuration in the first coupling area and in the second coupling area and is aligned essentially at right angles to the pivot axis. In this case, the coupling device may have, for example, coupling element end areas that are arranged overlapping one another in at least one of the coupling areas especially in case of a one-piece configuration of the coupling device, which is thus easy to embody.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
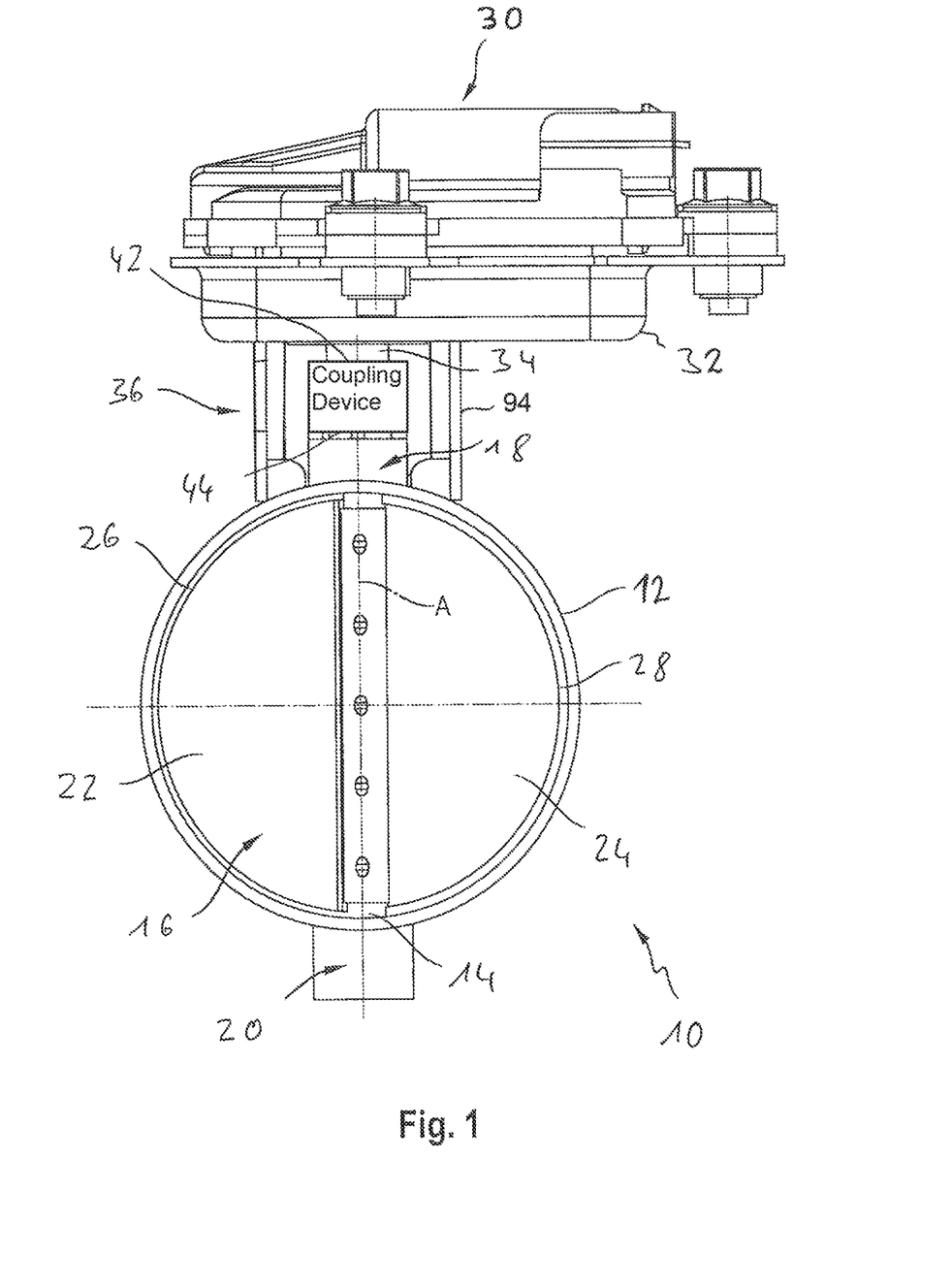
FIG. 1 is a partially schematic view showing an exhaust gas flap.
Figure 2:
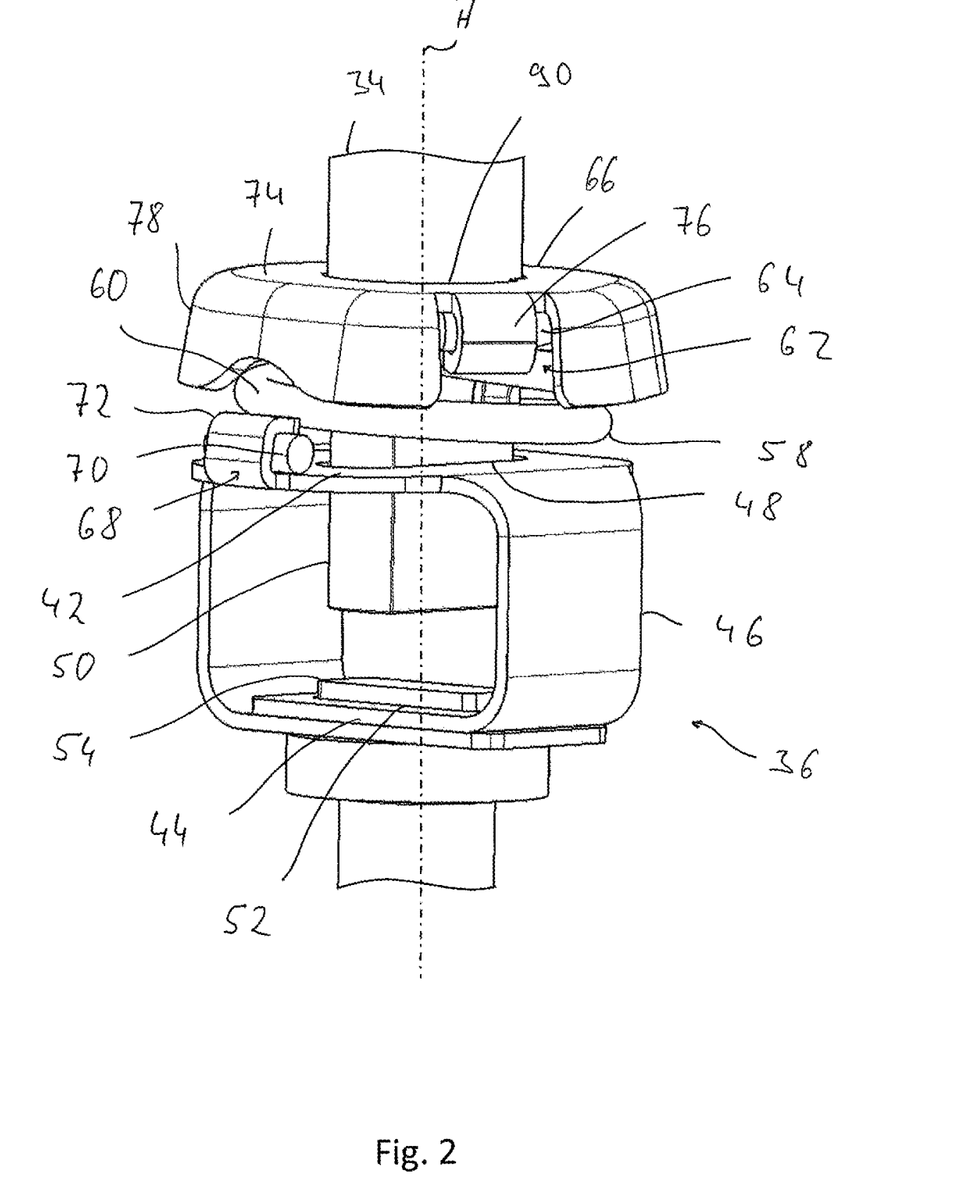
FIG. 2 is a perspective view of the coupling of a drive shaft of a pivot drive of an exhaust gas flap with a pivot shaft of the exhaust gas flap, which coupling is configured according to the present invention.

Referring to the drawings, an exhaust flap 10, which is shown in FIG. 1, comprises a flap tube 12, which is to be integrated into an exhaust system and which has, for example, a circular cross section and provides a housing for a flap diaphragm 16 that is carried on a pivot shaft 14 rotatable about a pivot axis A. The pivot shaft 14 is carried rotatably about the pivot axis A on respective mounting attachments 18 and 20 in its two end areas. The mounting attachments 18 and 20 protrude from the exhaust gas pipe (flap tube) 12. The flap diaphragm 16 provided at the pivot shaft 14 has two diaphragm wings 24, which are in contact with respective wing stops 26, 28 on the inner circumference of the flap tube 12 in the closed state of the flap diaphragm shown in FIG. 1 and thus essentially block the exhaust gas flow path through the flap tube 12. When the flap diaphragm 16 is rotated, for example, by about 90° about the pivot axis A starting from the closed state shown in FIG. 1, the two flap wings 22, 24 are essentially aligned parallel to the flow direction of the exhaust gas, so that exhaust gas can flow through the flap tube 12 essentially unhindered.

A pivot drive 30 for the flap diaphragm 16 is carried on the flap tube 12. The pivot drive 30 comprises an electric motor accommodated in a housing 32. A drive shaft 34 of the flap drive (pivot drive) 30 protruding from the housing 32 is coupled to the pivot shaft 14 via a coupling device generally designated by 36 for joint rotation and can thus rotate the flap diaphragm 16 about the pivot axis A when the electric motor is energized.

FIGS. 2 through 6 show an approximately box-like coupling element 46 of the coupling device 36, which may be bent, for example, from a strip of sheet metal and provides the first coupling area 42 in a first plate-shaped area and the second coupling area 44 in a second plate-shaped area formed by ends which overlap one another. In the first coupling area 42, the coupling element 46 has a first positive-locking meshing opening 48, with which the positive-locking meshing end 50 of the drive shaft 34 meshes. The first positive-locking meshing opening 48 has a meshing opening cross-sectional geometry which is configured, for example, like an elongated hole, to which meshing opening cross-sectional geometry a meshing end cross-sectional geometry of the positive-locking meshing end 50 of the drive shaft 34 is complementary. For example, the two cross-sectional geometries may have a configuration that is polygonal, for example, essentially rectangular. The positive-locking meshing end 50 of the drive shaft 34 has an essentially cylindrical shape, i.e., it has a cross-sectional geometry and cross-sectional dimensions that essentially do not change in the axial direction in its length area interacting with the coupling element 46.

Correspondingly, a second positive-locking meshing opening 52, with which a positive-locking meshing end 54 of the pivot shaft 14 meshes, is formed in the second coupling area 44. Also here, a meshing opening cross-sectional geometry of the second positive-locking meshing opening 52 and a meshing end cross-sectional geometry of the positive-locking meshing end 54 of the pivot shaft 14 may be complementary to one another, so that the pivot shaft 14 with its positive-locking meshing end 54 may essentially mesh with the second positive-locking meshing opening 52 with no play. This can then be supported by the positive-locking meshing end 54 being configured as tapering in the direction towards its free end, i.e., in the direction towards the drive shaft 34.

A biasing/prestressing element 58 is configured as a compression coil spring and has a plurality of windings 60 enclosing the pivot axis A of the pivot shaft 14. In an axial end area 62 at a distance from the coupling element 46, the biasing/prestressing element 58 has a first connection area that is provided, for example, by a winding end section 64 of same, in which connection area the biasing/prestressing element 58 is fixed to a connection element 66, which has a cup-like or pot-like shape. In a second axial end area 68, the biasing/prestressing element 58 has a second connection area provided, for example, by a second winding end section 70, in which second connection area the biasing/prestressing element 58 is fixed to the connection element 46. For this purpose, a mounting strap 72 which is placed about the winding end section 70 and firmly clamps same by pressing, may be provided at the connection element 46 in the area of the first coupling area 42. Correspondingly, a connection strap 76, which encloses the first winding end section 74 and firmly clamps same by pressing, may be provided at the connection element 66, protruding from a bottom area 74 of same.

While a circumferential wall area 78 protruding from the bottom area 74 of the connection element 66 approximately in the direction of the pivot axis A guarantees a defined positioning of the biasing/prestressing element 58 in the radial direction, the bottom area 74 is configured for connecting the connection element 66 to the drive shaft 34. For this purpose, the drive shaft 34 has, for example, two connection recesses 80 (FIGS. 3 and 5) arranged spaced apart from one another in the circumferential direction. Each of the connection recesses 80 has an insertion section 82, which is open axially in the direction towards the positive-locking meshing end 50 of the drive shaft 34 or towards the pivot shaft 14 and extends approximately in the axial direction, as well as a connection section 86 that is offset thereto in the circumferential direction and is closed axially by an axial front wall 84 in the direction away from the positive-locking meshing end 50 and the pivot shaft 14, and extends approximately axially. The insertion section 82 passes over into the connection section 86 via a connection section 88 that runs set at an essentially oblique angle.

Figure 3:
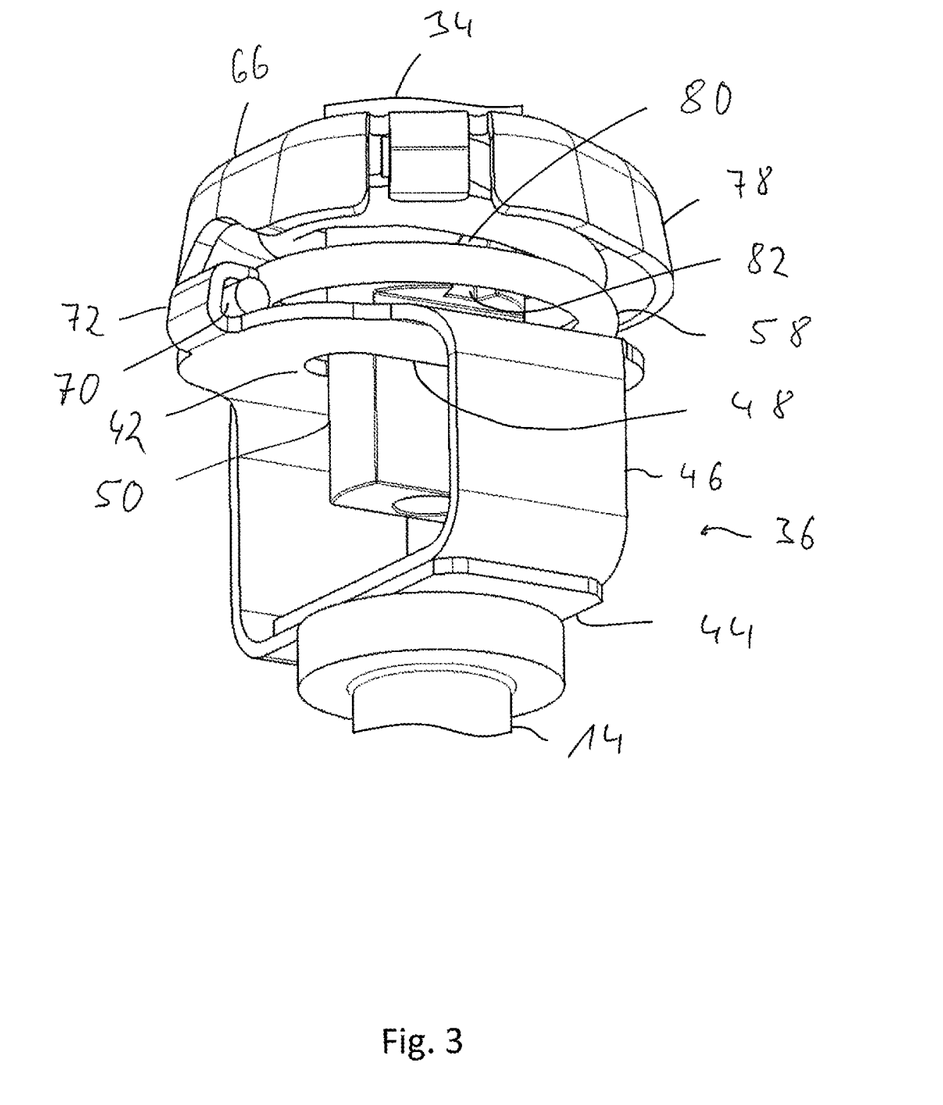
FIG. 3 is a perspective view, providing a different perspective as compared to FIG. 2.
Figure 4:
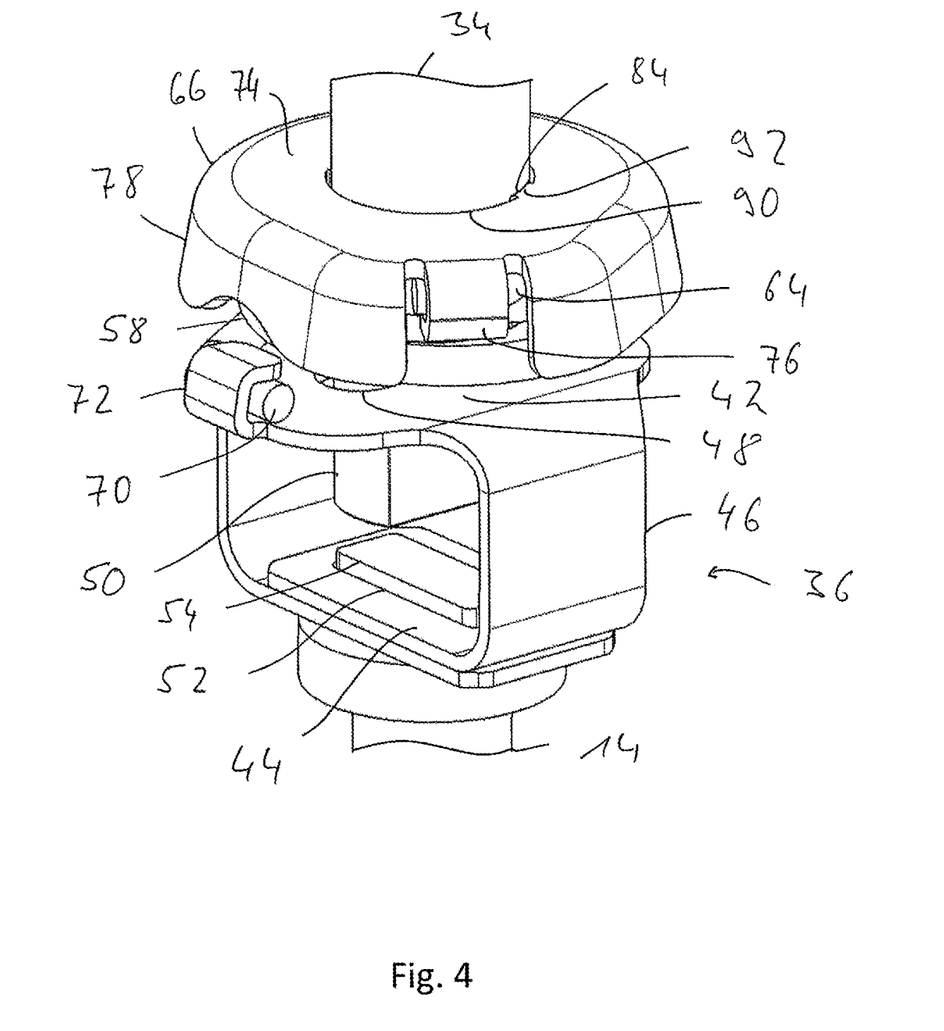
FIG. 4 is a perspective view, providing a different perspective as compared to FIG. 2.
Figure 5:
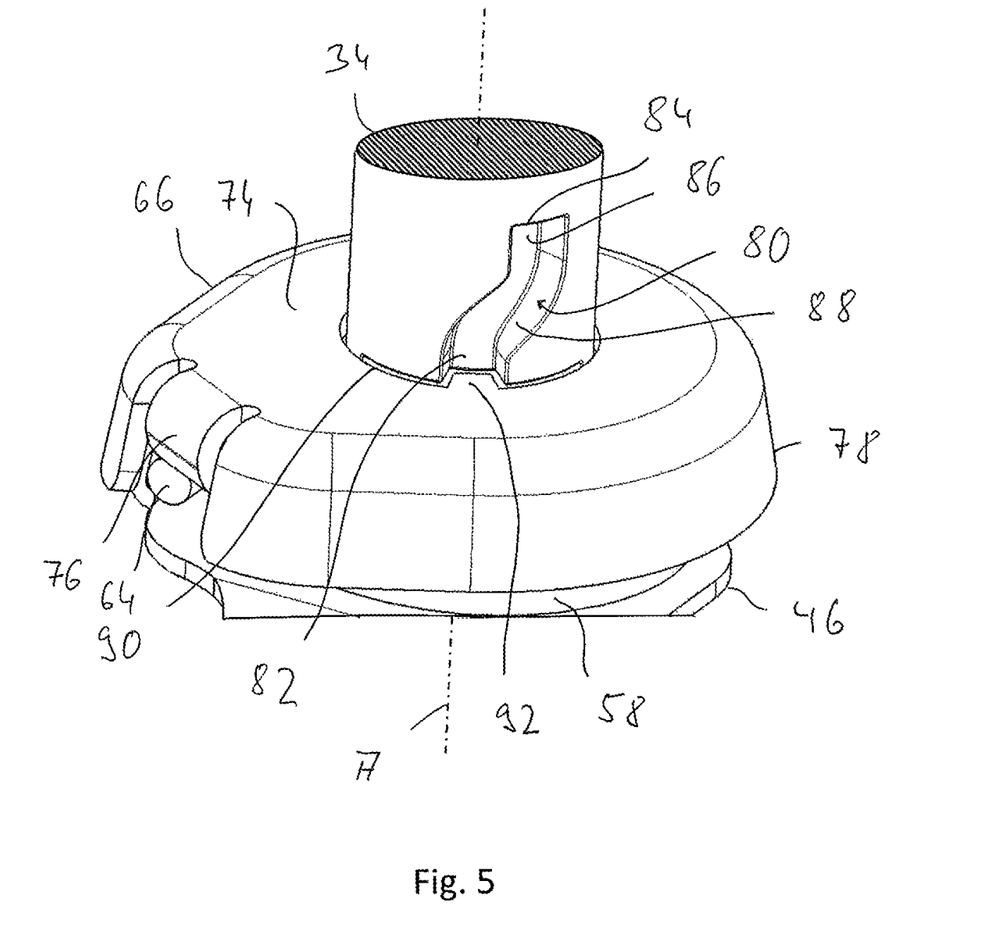
FIG. 5 is a perspective detail view which shows the coupling of a connection element to the drive shaft of the pivot drive.

Each of the connection recesses 80 forms with its groove-like configuration open radially outwards a guide link for a connection projection 92 protruding radially inwards into an opening 90 provided thereon at the bottom area 74. Each connection projection 92 is shaped and dimensioned such that it meshes with the connection recess 80 associated therewith or receiving same approximately with no play in the circumferential direction. When a respective connection projection 92 is moved into a connection recess 80, the connection element 66 may first be displaced axially until a respective connection projection 92 reaches the area of the connection section 88. Because the connection section 88 is set at an oblique angle, a rotation of the connection element 66 about the pivot axis A is forced when the connection element 66 is moved further in the direction towards the connection section 86 and the front wall 84. At the end of this movement, the connection element 66 rotated in the circumferential direction in relation to the starting position is again moved axially until the connection projection 92 being moved through the connection section 86 comes into contact with the front wall axially closing or ending a respective connection recess 80 and thus preventing a further axial movement of the connection element 66.

During the assembly of an exhaust gas flap 10 using the manner of coupling the drive shaft 34 to the pivot shaft 14, which coupling is described above with reference to FIGS. 2 through 5, after the flap diaphragm 16 was integrated into the flap tube 12, the coupling element 46 of the coupling device 36 is first fixed to the positive-locking meshing end 54 of the pivot shaft 14 together with the biasing/prestressing element 58 and with the connection element 66. For this purpose, the second positive-locking meshing opening 52 is pushed, for example, over the positive-locking meshing end 54 of the pivot shaft 14 until the coupling element 46 is axially close to the pivot shaft 14 in the area of its [of the coupling element] second coupling area 40. A permanent connection between the pivot shaft 14 and the coupling element 46, for example, by welding or soldering, can then be generated in this state in the area of the positive-locking meshing end 54 or of the second coupling area 44. In case of an alternative configuration without the positive-locking meshing end meshing with a positive-locking meshing opening, the coupling element 46 with its second coupling area 44, which has a plate-shaped configuration, could be placed onto a front surface of the pivot shaft 14 and butt-welded to same to obtain the permanent connection.

Before mounting, but possibly also after mounting, the connection element 46 on the pivot shaft 14, may be assembled with the biasing/prestressing element 58 and also with the connection element 66. For this purpose, the biasing/prestressing element 58 is first fixed, for example, to the coupling element 46 or to the connection element 66 in its respective associated winding end section 70 or 64 by bending and pressing a respective strap 72 or 76 before the permanent coupling of the biasing/prestressing element 58 to the respective other element is correspondingly achieved by the connection element 66 and the coupling element 46.

The flap tube 12, which is preassembled in this manner with the coupling device 36, with the biasing/prestressing element 58 and with the connection element 66 and also has the flap diaphragm 16, is subsequently mounted on the pivot drive 30. A carrier structure 94 can be fixed for this purpose, for example, by welding, for example, from the outer circumference of the flap tube 12. The pivot drive 30 is moved towards the flap tube 12 such that the positive-locking meshing 50 of the drive shaft 34 thereof is inserted through the opening 90 in the connection element 66 into the first positive-locking meshing opening 48 in the first coupling area 42 of the coupling element 46. In the course of this movement, the connection projections 92 also reach the area of the connection recesses 80 receiving these connection projections 92 and first enter the insertion section 82. A further continuing axial movement of the pivot drive 30 towards the flap tube 12 leads to the connection projections 92 being guided through the connection recesses 80 receiving same until they reach the connection sections 86 and come axially into contact there with the front walls 84 or other formations closing the connection sections 86 against axial movement of the connection projections 92 received therein. In the course of this movement, the connection element 66 is rotated, as explained above, about the pivot axis A in relation to the drive shaft 34. The biasing/prestressing element 58 and with this the coupling element 46 may follow this rotation only until a circumferential clearance of movement present between the positive-locking meshing end 50 and the first coupling area 42 is used up. If this is the case, a rotation of the connection element 66, which is continued until the connected state is reached, leads to a circumferential relative movement of the two winding end sections 70, 64 of the biasing/prestressing element 58 in relation to one another, so that the biasing/prestressing element 58 is stressed in the circumferential direction and a circumferential prestress is generated in this manner between the drive shaft 34 and the coupling element 46.

Since the connection projections 92 that are received in the connection sections 86 of the connection recesses 80 are in contact with the respective front walls 84 in the connected state of the connection element 66 in relation to the drive shaft 34, the connection element 66 is also unable to be further displaced in relation to the drive shaft 34. A continued axial movement of the pivot drive 30 in the direction towards the flap tube 12 until reaching the mounting position, which can also be seen in FIG. 1 and in which the pivot drive 30 is close to the carrier structure 94 or is carried by same, leads to an axial compression of the biasing/prestressing element 58, so that the biasing/prestressing element 58, being axially supported via the connection element 66 in relation to the drive shaft, exerts an axial prestress onto the coupling element 46 and via this onto the pivot shaft 14 in this manner.

On the one hand, a defined circumferential relative positioning between the drive shaft 34 and the coupling element 46 is thus forced by the biasing/prestressing element 58, which is configured as a compression coil spring in the exemplary embodiment shown, so that no backlash can occur between this drive shaft 34 and the coupling element 46 when the drive shaft 34 is rotated. At the same time, a defined positioning of the pivot shaft 14 in the flap tube 12 in the direction of the pivot axis A is forced by the axial prestress generated by means of the biasing/prestressing element 58. The axial prestressing action between the drive shaft 34 and the pivot shaft 14 generated by the biasing/prestressing element 58 ensures, moreover, that in the connected state, the connection element 66 with its connection projections 92 are reliably held in the connection sections receiving these connection projections 92 in contact with the front walls 84 axially defining these connection sections, and thus the connection element 66 is held in a defined position in relation to the drive shaft 34.

It should be noted that the carrier structure 94 may be permanently connected to the pivot drive 30, for example, by positive-locking meshing like a quarter-turn fastener or/and by connection in substance, i.e., for example, by welding.

With the configuration according to the present invention of the coupling between the drive shaft 34 and the pivot shaft 14, a defined relative positioning of these two shafts is forced, so that a clearance of movement of the two shafts 34, 14 in relation to one another leading to undefined positionings of the flap diaphragm 16 cannot occur. At the same time, a contact between the two shafts 14, 34, which leads to the transfer of heat, is essentially limited to the area, in which the coupling element 66 contacts the pivot shaft 14 and the drive shaft 34 as well as the area, in which the coupling element 66 contacts the drive shaft 34, as a result of which a very good thermal uncoupling with high mechanical strength of the assembly unit intended for coupling and also with good resistance to external effects, especially to corrosion, is achieved. Further, the uncoupling of the movements of the two shafts 14, 34 in relation to one another, which uncoupling is present in the direction of the pivot axis, makes possible thermally induced relative movements, without constraints forming in any mounting areas, and the compensation of component tolerances as well as assembly tolerances occurring during the production process.

Figure 6:
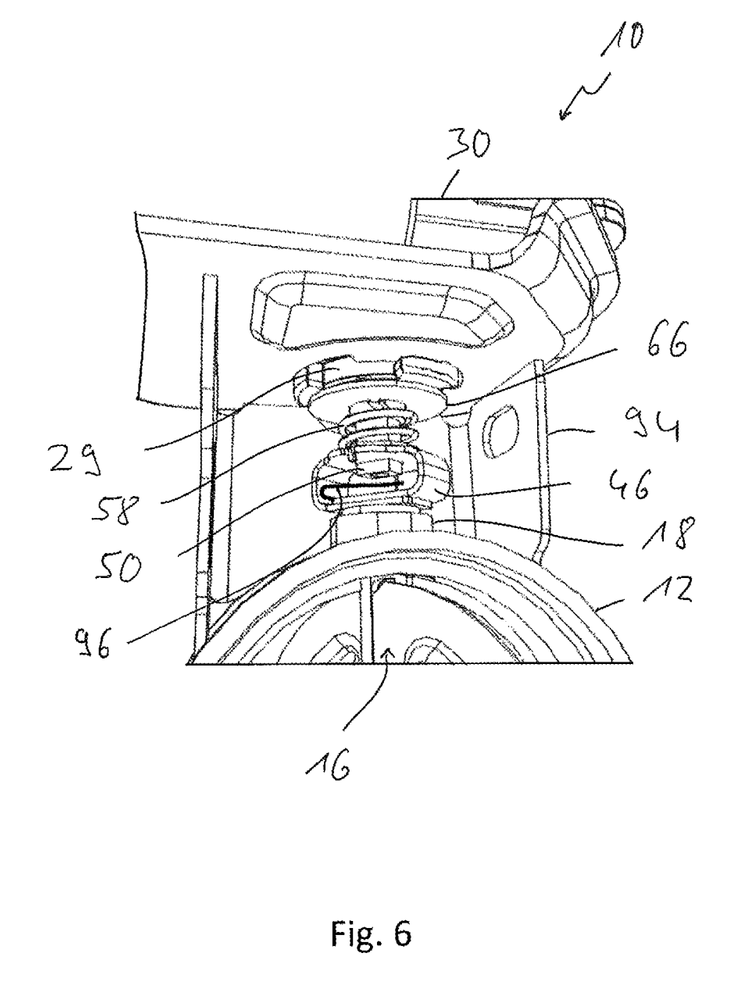
FIG. 6 is a perspective view showing the pivot shaft of a flap diaphragm, which pivot shaft is coupled to the drive shaft of a pivot drive.

The thermal uncoupling of the two shafts 14, 34 from one another can be supported by, as shown in FIG. 6, a heat radiation shielding element 96, made, for example, of sheet metal material, which is held, for example, at the coupling element 46, is located between the ends of the two shafts 14, 34, which ends are located opposite one another, and thus also shield these against the transfer of heat due to radiation in relation to one another.

Further, FIG. 6 shows that the connection element 66 may also have, for example, a plate-shaped configuration, i.e., without circumferential wall area. The biasing/prestressing element 58, which is also configured as a compression coil spring in this configuration, may be fixed in the circumferential direction to the connection element 66, which has, for example, a plate-shaped configuration, or/and to the coupling element 46 in its winding end sections 64, 70 by ends, which are axially bent and mesh with corresponding recesses in the connection element 66 and coupling element 46.

Finally, it should be noted that, of course, it is also possible to embody a configuration, in which the biasing/ prestressing element acts between the pivot shaft 14 and the coupling element 46. In such a configuration, the corresponding shape of the ends of the two shafts 34, 14 facing one another would then be exchanged with one another, so that in a preassembled state the coupling element 46 including the biasing/prestressing element 58 and the connection element 66 is preassembled with the drive shaft 34, and the pivot shaft 34 is then brought into positive-locking meshing with the connection element 66 during the final assembly. Further, it should be noted that the pivot shaft 14 may have, for example, a multipiece configuration and may have a shaft section, which is carried pivotably on the flap tube 12 and carries the diaphragm wings 22, 24, as well as a shaft section that provides the positive-locking meshing end 54 and is configured as a separate component. As an alternative, the pivot shaft 14 may, of course, have a one-piece configuration with all functional sections of same.

While specific embodiments of the invention have been shown and described in detail to illustrate the application of the principles of the invention, it will be understood that the invention may be embodied otherwise without departing from such principles.

What is claimed is:

1. An exhaust gas flap for an exhaust gas stream, the exhaust gas flap comprising:
   a flap tube;
   a pivot shaft;
   a flap diaphragm carried in an interior of the flap tube on the pivot shaft and rotatable about a pivot axis;
   a pivot drive with a drive shaft, the pivot drive for rotating the pivot shaft;
   a coupling device coupling the pivot shaft to the drive shaft of the pivot drive for joint rotation about the pivot axis, the coupling device comprising a first coupling area that is in a state of rotary coupling and positive-locking meshing with the drive shat, a second coupling area that is in a state of rotary coupling and positive-locking meshing with the pivot shaft;
   a connection element; and
   a biasing element supported in relation to the coupling device and supported in relation to one shaft of the drive shaft and the pivot shaft, the coupling device being axially prestressed by the biasing element away from the connection element and the one shaft in a direction of the pivot axis and being prestressed about the pivot axis in relation to the one shaft, wherein the connection element is non-rotatably coupled to the one shaft and axially supported on the one shaft, the biasing element being supported in relation to the one shaft via the connection element.

2. An exhaust gas flap in accordance with claim 1, wherein the biasing element comprises a coil spring.

3. An exhaust gas flap in accordance with claim 2, wherein the biasing element comprises at least one winding.

4. An exhaust gas flap in accordance with claim 1, wherein:
   the biasing element is fixed, via the connection element, in a first connection area in relation to the one shaft and is axially supported on the one shaft about the pivot axis in a circumferential direction; and
   the biasing element is fixed in a second connection area in relation to the coupling device and is axially supported on the coupling device about the pivot axis in the circumferential direction.

5. An exhaust gas flap in accordance with claim 4, wherein:
   the first connection area comprises a first winding end section extending in a first axial end area of the biasing element; and
   the second connection area comprises a second winding end section extending in a second axial end area of the biasing element.

6. An exhaust gas flap in accordance with claim 4, wherein the first connection area of the biasing element is permanently coupled to the connection element.

7. An exhaust gas flap in accordance with claim 1, wherein:
   the one shaft has at least one connection recess; and
   the connection element has at least one connection projection in association with the at least one connection recess, which meshes with the at least one connection recess and is axially supported on the one shaft in a connected state and in a circumferential direction.

8. An exhaust gas flap in accordance with claim 7, wherein:
   the at least one connection recess comprises an insertion section, which is open in a direction towards the other shaft, a connection section, which is closed axially in a direction away from the other shaft, and a transition section, the connection section being offset in relation to the insertion section in the circumferential direction and being connected by means of the transition section to the insertion section; and
   an axial movement of a connection projection in the at least one connection recess through the insertion section thereof, to the connection section, brings about a rotation of the connection element about the pivot axis in relation to the one shaft.

9. An exhaust gas flap in accordance with claim 1, wherein:
   in the first coupling area the coupling device has a first positive-locking meshing opening with a meshing opening cross-sectional geometry and the drive shaft has a positive-locking meshing end, which meshes with the first positive-locking meshing opening and which has a meshing end cross-sectional geometry complementary to the meshing opening cross-sectional geometry of the first positive-locking meshing opening; or
   in the second coupling area the coupling device has a second positive-locking meshing opening with a meshing opening cross-sectional geometry and the pivot shaft has a positive-locking meshing end that meshes with the second positive-locking meshing opening and that has a meshing end cross-sectional geometry complementary to the meshing opening cross-sectional geometry of the second positive-locking meshing opening; or
   in the first coupling area the coupling device has a first positive-locking meshing opening with a meshing opening cross-sectional geometry and the drive shaft has a positive-locking meshing end, which meshes with the first positive-locking meshing opening and which has a meshing end cross-sectional geometry complementary to the meshing opening cross-sectional geometry of the first positive-locking meshing opening and in the second coupling area the coupling device has a second positive-locking meshing opening with a meshing opening cross-sectional geometry and the pivot shaft has a positive-locking meshing end that meshes with the second positive-locking meshing opening and that has a meshing end cross-sectional geometry complementary to the meshing opening cross-sectional geometry of the second positive-locking meshing opening.

10. An exhaust gas flap in accordance with claim 9, wherein the positive-locking meshing end of the one shaft has an essentially cylindrical configuration in the direction of the pivot axis.

11. An exhaust gas flap in accordance with claim 1, wherein the coupling device and the biasing element are carried on the other shaft secured against detachment from the other shaft.

12. An exhaust gas flap in accordance with claim 1, wherein the one shaft is the drive shaft and the other shaft is the pivot shaft.

13. An exhaust gas flap in accordance with claim 1, wherein the coupling device comprises a coupling element, which has an essentially plate-shaped configuration in the first coupling area and in the second coupling area and is aligned essentially at right angles to the pivot axis.

14. An exhaust gas flap in accordance with claim 13, wherein the coupling device has coupling element end areas that are arranged overlapping one another in at least one of the coupling areas.

15. An exhaust gas flap in accordance with claim 1, wherein the coupling, device comprises a coupling element peripheral surface, the connection element being located at a spaced location from the coupling element peripheral surface.

16. An exhaust gas flap in accordance with claim 1, wherein the coupling device is located at a spaced location from the connection element.

17. An exhaust gas flap in accordance with claim 1, wherein the coupling device comprises a coupling element interior space, the biasing element being located at a position located outside of the coupling element interior space.

18. An exhaust gas flap for an exhaust gas stream, the exhaust gas flap comprising:
    a flap tube;
    a pivot shaft;
    a flap diaphragm carried in an interior of the flap tube on the pivot shaft and rotatable about a pivot axis;
    a pivot drive with a drive shaft, the pivot drive for rotating the pivot shaft;
    a coupling device coupling the pivot shaft to the drive shaft of the pivot drive for joint rotation about the pivot axis, the coupling device comprising a first coupling area that is in a state of notary coupling and positive-locking meshing with the drive shaft, a second coupling area that is in a state of rotary coupling and positive-locking meshing with the pivot shaft;
    a connection element; and
    a biasing element supported in relation to the coupling device and supported in relation to one shaft of the drive shaft and the pivot shaft the coupling device being axially prestressed by the biasing element away from the connection element and the one shaft in a direction of the pivot axis and being prestressed about the pivot axis in relation to the one shaft, wherein the connection element is non-rotatably coupled to the one shaft and axially supported on the one shaft, the biasing element being supported in relation to the one shaft via the connection element, the biasing element being arranged between the connection element and the coupling device.

19. An exhaust gas flap in accordance with claim 18, wherein the coupling device is located at a spaced location from the connection element.

20. An exhaust gas flap in accordance with claim 18, wherein the coupling device comprises a coupling element interior space, the biasing element being located at a position located outside of the coupling element interior space.

\* \* \* \* \*